United States Patent [19]

Eisenberg

[11] 4,303,429

[45] Dec. 1, 1981

[54] APPARATUS AND METHOD FOR PRODUCTION OF MINERAL FIBERS

[75] Inventor: Arnold J. Eisenberg, Granville, Ohio

[73] Assignee: Owens-Corning Fiberglas Corporation, Toledo, Ohio

[21] Appl. No.: 185,106

[22] Filed: Sep. 8, 1980

[51] Int. Cl.³ .......................................... C03B 37/025
[52] U.S. Cl. ................................. 65/1; 65/2; 65/12
[58] Field of Search .................... 65/1, 2, 12

[56] References Cited

U.S. PATENT DOCUMENTS

| | | | |
|---|---|---|---|
| 2,244,267 | 6/1941 | Slayter et al. | 65/12 X |
| 2,783,590 | 3/1957 | Stalego | 65/12 |
| 3,309,184 | 3/1967 | Stalego | 65/1 |
| 3,736,116 | 5/1973 | Russell | 65/2 |
| 4,202,680 | 5/1980 | Thompson | 65/12 |

FOREIGN PATENT DOCUMENTS

| | | | |
|---|---|---|---|
| 1175821 | 9/1961 | Fed. Rep. of Germany | 65/1 |
| 45-28738 | 9/1970 | Japan | 65/1 |

*Primary Examiner*—Robert L. Lindsay, Jr.
*Attorney, Agent, or Firm*—Ronald C. Hudgens; Philip R. Cloutier; Kenneth H. Wetmore

[57] ABSTRACT

The present invention embraces an apparatus for, and methods of, forming mineral fibers, such as glass. Such invention comprising a mineral fiber forming bushing bottom wall comprising a base plate and elongated members projecting downwardly from the exterior undersurface of the base plate. The base plate is of a porous material such as a sintered, foamed or fusion bonded material to form a rigid structure adapted for flow of molten mineral material therethrough to form a layer of molten mineral material along the exterior undersurface thereof. The rod members are adapted for flow thereon of the molten mineral material from the flooded exterior undersurface for attenuation into mineral fibers.

18 Claims, 3 Drawing Figures

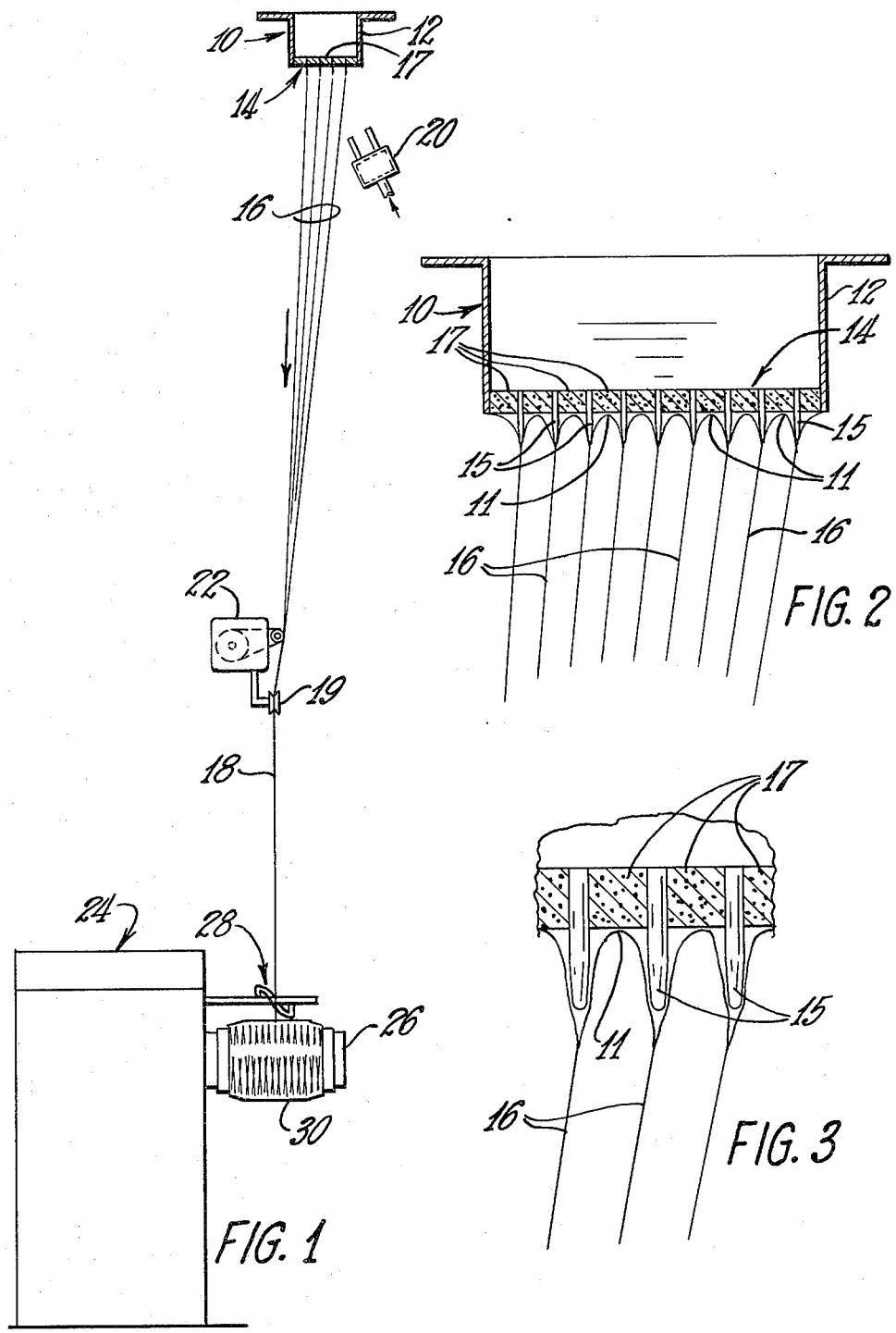

APPARATUS AND METHOD FOR PRODUCTION OF MINERAL FIBERS

TECHNICAL FIELD

The invention relates to apparatus for, and methods of, forming fibers from heat softened mineral material, such as glass. More specifically, this invention relates to bushing or feeder apparatus comprising a porous base plate, such as a plate of a sintered, foamed or fusion bonded material, and elongated rod members projecting from the base plate. Also, this invention relates to methods of forming fibers comprising flowing material through a porous base plate to flood the exterior undersurface thereof and supplying streams of material for attenuation into fibers by flowing the flooded material over elongated rod members projecting downwardly from the base plate.

BACKGROUND OF THE INVENTION

In recent years, there has been considerable interest in the production of mineral fibers such as glass fibers. Due to the increased usage of glass fibers, this interest has particularly focused on improved apparatus and methods for the production of such fibers.

In the production of such fibers, molten glass is typically passed through orificed tips in a bushing or stream feeder to create individual cones of glass for the attenuation of fibers therefrom. As the molten streams of glass flow through the orificed projections for attenuation into fibers, the bushing and fiber forming environment are carefully controlled to avoid flooding of the molten glass material along the undersurface of the bushing. If such flooding occurs, the fiber forming operation is disrupted, and thus, production is stopped.

By use of Applicants' invention, this fiber forming disruption problem because of bushing flooding is eliminated. In fact, the tendency of molten material to flood is capitalized on by Applicants' fiber forming apparatus and methods in that the streams of material for attenuation into fibers are drawn from a deliberately flooded bushing.

SUMMARY OF THE INVENTION

The present invention comprises a bushing for the production of mineral fibers such as glass. The bushing comprises upwardly extending sidewalls and a bottom wall extending between the sidewalls. The bottom wall comprises a base plate, the base plate being of a porous material, such as a sintered, foamed or fusion bonded material, forming a rigid porous structure adapted for flow of molten mineral material therethrough to form a layer of molten mineral material on the undersurface of the base plate. The bottom wall further comprises elongated members projecting downwardly from the exterior undersurface of the base plate. The elongated members are adapted for the flow thereon of the molten mineral material from the exterior undersurface and for the attenuation of mineral fibers therefrom.

The present invention further comprises an apparatus for forming mineral fibers comprising a stream feeder for flowing streams of molten mineral material, means attenuating fibers from the streams of molten mineral material, and means for directing gas upwardly into contact with the streams of molten mineral material at a velocity and in an amount effective to convey away from the streams sufficient heat to render the material of the streams attenuable into fibers, the improvement comprising a stream feeder bottom wall assembly which comprises a porous base plate adapted for flow of molten mineral material therethrough to form a layer of molten mineral material on the exterior undersurface thereof and elongated members projecting from the exterior undersurface. The elongated members are adapted for flow thereon of the molten mineral material of the layer for attenuation into mineral fibers.

The present invention comprises methods of forming mineral fibers. A method comprises flowing molten mineral material through a porous bushing bottom wall to flood the exterior undersurface of the bottom wall with the material, flowing streams of the material from the flooded undersurface onto rod members projecting downwardly from the bottom wall, and attenuating fibers from the streams of molten mineral material from the rod members. The method can further comprise the step of directing gas into the streams of material at a velocity and in an amount effective to convey from the streams sufficient heat to render the material of the streams attenuable to fibers.

An object of the invention is an improved apparatus and methods for the production of mineral fibers, such as glass fibers.

Another object of the invention is to provide an improved bushing for use in the manufacture of mineral fibers, such as glass fibers.

These and other objects of the invention will become more apparent as the invention is described hereinafter in detail with reference to the accompanying drawings.

DESCRIPTION OF THE DRAWINGS

FIG. 1 is a semi-schematic elevational view of a fiber forming apparatus in accordance with the invention.

FIG. 2 is an enlarged sectional view of the bushing of FIG. 1.

FIG. 3 is an enlarged side view of a portion of the bushing bottom wall area of FIG. 2.

DESCRIPTION OF THE PREFERRED EMBODIMENTS

Before explaining the present invention in detail, it is to be understood that the invention is not limited in application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the apparatus and method of the invention have particular utility in the processing of glass for forming fibers or filaments, it is to be understood that the apparatus and method can be employed for producing fibers from other materials.

Referring to the drawings in detail, FIG. 1 illustrates a fiber forming operation. Mineral material, such as glass, is maintained in a molten condition in bushing or stream feeder assembly 10. The bushing assembly comprises upwardly extending sidewalls 12 and bottom wall assembly 14 which will be described in more detail later. Fibers 16 are attenuated from molten glass material passing through the bushing assembly. The fibers are coated by size applicator 22 and gathered into strand 18 by gathering shoe 19. The strand is then collected by winder assembly 24. The strand is reciprocated by traverse 28 for collection into package 30 on winder collet 26.

To control the glass fiber forming environment, blower means 20 is provided. This blower means directs gas, such as air, upwardly into contact with the molten material passing through the bushing, at a velocity and in an amount effective to convey away from the streams of glass sufficient heat to render the material attenuable into fibers. Such a blower assembly is described in U.S. Pat. No. 4,202,680 issued May 13, 1980, and is hereby incorporated by reference.

In general, the bushing or stream feeder has a bottom wall assembly comprising a porous base plate and elongated rods or members projecting from the exterior surface of the base plate. The porous plate is adapted for flow of molten mineral material therethrough to form a layer of molten mineral material on the exterior undersurface thereof, and the elongated members are adapted for flow thereon of the molten mineral material of the layer for attenuation into mineral fibers from the end regions thereof. The density and uniformity of the porous plate are closely controlled so that the desired rate of flow of molten material occurs therethrough during operation.

Such a porous plate can be constructed of a sintered powdered metal, such as platinum-rhodium. The sintered metallic powder forms a rigid porous structure adapted for flow of such material. The plate can also be constructed of an open cell, foamed material, such as a platinum alloy material, or a fusion bonded material, such as a bonded platinum alloy wire cloth structure.

Elongated rods or members are attached to the base plate. For example, holes can be drilled through the porous plate and elongated rods or members inserted therein so that they project downwardly from the exterior undersurface thereof. The members can be welded, for example, by laser techniques to the base plate for attachment thereto.

For flow control and rigidity of the structure, it is preferred that the pore openings of the porous material be relatively small. For example, the transverse cross section of the elongated members at the exterior undersurface can be greater than the size of the pore openings at the exterior undersurface.

It can be desirable to provide an internal support system for the bushing bottom wall. For example, an egg crate structure, gusset assembly system or other conventional support system can be welded or otherwise secured inside the bushing assembly to restrict sagging of the bottom wall during operation.

FIGS. 2 and 3 show the bushing assembly in more detail. As shown, the bottom wall assembly 14 is connected to the upwardly extending sidewalls 12. This can be done by diffusion bonding, welding or other conventional attaching techniques. The bottom wall assembly comprises a porous base plate 17 and elongated members or projections 15. The sidewalls, base plate and rod members can all be made of a platinum-rhodium alloy or other materials which perform in the high temperature fiber forming environment.

The base plate thickness and porosity are determined by the strength and rigidity needed by the bottom wall to be structurally sound during operation as well as by the quantity of glass desired to flow through the bushing. The flow porosity is shown to be generally uniform along the exterior undersurface of the base plate. It is within the scope of the invention, however, that some areas of the base plate can be more porous than others, thus allowing greater flow through some areas than through others for a particular flow pattern through the base plate. A uniform flow of glass flooding over the bottom surface of the bushing (forming a generally uniform layer) is, however, preferred. Generally the porous openings are designed for substantially the same flow rate of material therethrough as will be attenuated away into fibers during operation.

As shown, elongated rod members or projections 15 extend from the exterior undersurface of the base plate. The rod members can extend from the plate in any suitable manner. For example, the members can extend through the base plate or be attached to its lower surface. The molten mineral material flooding the exterior undersurface of the base plate flows onto the rod members from which it is attenuated into fibers. It is preferred that the rod members have a relatively short length projecting below the bottom wall such as, for example, in the range of from about 40 mils to about 150 mils and that the rod members be relatively small in diameter such as, for example, in the range of from about 20 mils to about 40 mils. As shown, each rod member has a circular cross-sectional shape and the end region of each rod member terminates beneath the bottom wall with a conical shape. The rod members can have other cross-sectional shapes, such as, for example, square or oval. Also, the rod members can terminate with a flat surface or a rounded surface rather than a sharp point. The rod members are shown to be of a solid, uniform construction but it is within the scope of the invention that they be hollow or of a composite construction.

As can be readily seen, such a bushing construction can provide a means for producing a large number of filaments from a small bushing bottom wall area. Rod members can be placed in a highly dense fashion along the exterior undersurface of the base plate. For example, the rod members per square inch of bottom wall density (and consequently, resulting fibers per square inch density) can be in the range of from about 50 to about 200.

As shown in FIG. 3, molten glass material flows through the porous base plate 17 from above to flood the exterior undersurface of the wall member, and thus, form a generally uniform layer of glass 11 thereon. Streams of molten material are supplied from the flooded area by flowing the material over elongated members 15 projecting downwardly from the bottom wall. Fibers 16 are attenuated from the streams of molten mineral material flowing over the rod members. As shown, an individual fiber is attenuated from each rod member.

Having described the invention in detail, it will be understood that such specifications are given for the sake of explanation. Various modifications and substitutions other than those cited may be made without departing from the scope of the invention as defined in the following claims.

INDUSTRIAL APPLICABILITY

The present invention would be useful in the mineral fiber forming art and, in particular, in the glass fiber forming art.

I claim:
1. A mineral fiber forming bushing comprising:
   (a) upwardly extending sidewalls; and
   (b) a bottom wall assembly extending between the sidewalls comprising a base plate, the base plate being a porous structure adapted for flow of molten mineral material therethrough to form a layer of molten mineral material on the undersurface of said base plate and elongated members projecting downwardly from the base plate, the elongated members being adapted for the flow thereon of the molten mineral material from the exterior undersurface and for the attenuation of mineral fibers therefrom.

2. The bushing of claim 1 wherein the base plate is of sintered platinum/rhodium powdered metal.

3. The bushing of claim 1 wherein the base plate is of diffusion bonded platinum/rhodium wire cloth.

4. The bushing of claim 1 wherein the base plate is of a foamed platinum/rhodium material.

5. The bushing of claim 1 wherein the end regions of the elongated members have a conical shape.

6. The bushing of claim 1 wherein the elongated members and the rod members are of a platinum/rhodium alloy.

7. In an apparatus for forming mineral fibers comprising a stream feeder for flowing streams of molten mineral material, means attenuating fibers from the streams of molten mineral material, and means for directing gas upwardly into contact with the streams of molten mineral material at a velocity and in an amount effective to convey away from the streams sufficient heat to render the material of the streams attenuable to fibers, the improvement comprising a stream feeder bottom wall assembly comprising a porous base plate adapted for flow of molten mineral material therethrough to form a layer of molten mineral material on the exterior undersurface thereof and elongated members projecting from the exterior undersurface adapted for flow thereon of the molten mineral material from the layer for attenuation into mineral material fibers.

8. The apparatus of claim 7 wherein the transverse cross section of the members at the exterior undersurface is greater than the size of the pore openings at the exterior undersurface.

9. The apparatus of claim 7 wherein the elongated members are laser welded to the porous base plate.

10. The apparatus of claim 7 wherein the porous base plate is of a sintered material.

11. The apparatus of claim 7 wherein the porous base plate is of a foamed material.

12. The apparatus of claim 7 wherein the porous base plate is of a diffusion bonded wire cloth.

13. A method of forming mineral fibers comprising:
  (a) flowing molten mineral material through a porous bushing bottom wall to flood the exterior undersurface of the bottom wall with the material;
  (b) flowing streams of the material from the flooded undersurface onto rod members projecting downwardly from the bottom wall; and
  (c) attenuating fibers from the streams of molten mineral material from the rod members.

14. The method of claim 13 comprising the step of directing gas into contact with the streams of material at a velocity and in an amount effective to convey from the streams sufficient heat to render the material of the streams attenuable to fibers.

15. Apparatus for producing glass fibers comprising:
  (a) a porous member for flowing molten glass therethrough to form a layer of such glass at a porous exterior surface thereof; and
  (b) spaced-apart elongated members projecting from the porous surface, molten glass of the layer moving along the member for attenuation at the projected ends thereof.

16. Apparatus for producing glass fibers comprising:
  (a) a porous member for flowing molten glass therethrough to form a layer of such glass at a generally flat porous exterior surface thereof;
  (b) spaced-apart elongated member projecting from the exterior porous surface and along which molten glass of the layer moves away from the porous surface during production of fibers; and
  (c) means for withdrawing glass fibers from the molten glass at the projected end regions of the members.

17. Method of producing glass fibers comprising:
  (a) moving molten glass through a porous member to form a layer of molten glass at a surface thereof from which projects elongated members;
  (b) flowing molten glass of the layer to the projected end regions of the members; and
  (c) attenuating glass fibers from the molten glass at the end regions.

18. The method of claim 17 wherein the depth of the layer of molten glass formed at the surface is less than the projecting length of the members.

* * * * *